3,171,231
PROCESS OF CONDITIONING PLANTS AND PRODUCT

Thomas W. W. Forrest, 820 Carmen Ave., Fresno, Calif.
No Drawing. Filed Sept. 21, 1962, Ser. No. 225,372
7 Claims. (Cl. 47—2)

This invention relates to a plant conditioner, and to a process of conditioning plants, and has for one of its objects the provision of a product adapted to enter or to be absorbed by the sap of a plant, and to be carried thereby to all parts of such plant by the sap, and which product conditions the plant to resist attack by destructive insects and microorganisms and to also resist injury by freezing.

Another object of the invention is the provision of an improved method of conditioning plants that lack certain essentials that are normal to a healthy plant, and which plant when so conditioned will not only recover their health but will have a vigorous, healthy growth and the fruit will be sound and juicy and will remain so even under freezing conditions that are destructive to untreated plants and fruit.

A still further object of the invention is the provision of a liquid plant conditioner, and process, adapted for treating trees to render said trees resistant to scale and to destructive attacks by pests and to damage from frost, and also which product, when absorbed in the flowing sap will set a substantial amount of the newly developed fruit to resist dropping from trees, known as "fruit drops," and which dropping usually occurs after an excessively warm period following the blossoming of the fruit when the fruit is "setting."

Heretofore it has been the common practice in the citrus fruit industry for the growers to start orchard heating operations when the temperature reached approximately 28° F. and to continue such operations until the danger of freezing was over. However, even such operations are quite costly and the degree of protection they afford varies with wind conditions and variations in atmospheric temperature. Wind machines intended to mix warmer air with the cold air to elevate the air temperature in an orchard are also costly and are dependent upon there being warmer air in the immediate vicinity for mixing with the cold air, and where natural warm air is not so available, artificially heated air must be made accessible for mixing with the air currents produced by the wind machines.

By the present invention, it has been found that one application of approximately one half to two ounces of my product to each tree, each year, so that it will be carried by the sap to the fruit, will not only prevent freezing of the fruit at temperatures as low as approximately 20° F. for a period of time when fruit on untreated trees of the same kind, age, condition, and location would be severely damaged by freezing, but will also prevent injury to the tree. No artificial heating and no use of wind machines is involved.

The example of citrus trees is given because such trees, particularly lemon trees, are quite susceptible to injury from freezing, and the fruit on such trees matures in winter months when the freezing is most likely to occur. The same resistance to freezing of fruit and to injury to trees occurs where other trees than citrus trees are treated with the solution of this invention and by the process employed.

Several other beneficial results are obtained by use of my product and method. Trees that have been badly infested with scale have completely recovered and pests do not attack the leaves or other parts of the tree. Also the foliage is healthier in appearance where the trees are treated, and in fruit bearing trees the fruit appears to contain more sugar and to be larger and of better appearance.

The use of the product and process hereafter described, prevents the spoilage of citrus fruits. Usually such spoilage occurs within the fruit, rather than from the outside, and oranges that are from treated trees have been successfully kept, without spoilage, and at atmospheric temperature, for many weeks past the time when fruit from untreated trees would be completely spoiled. The pulp that is directly under the skin in such untreated fruit becomes hard as does the rind or skin, and the pulp almost disappears, but the juice filled cells are filled with unspoiled juice.

In detail, a solution consisting, by weight, of approximately 98% water and approximately 1.7% of a mixture of 100% pure dioctyl sodium sulfo-succinate, Epsom salt, and methyl anthranilate in which solution the mixture may be, by weight, approximately 0.737% dioctyl sodium sulfo-succinate, 0.737% Epsom salt and 0.184% methyl anthranilate.

The method of injecting this solution into a tree is to drill a hole of approximately one-half inch in diameter into the main trunk of the tree or vine, where the latter, as in many grape vines, is of substantial diameter. This hole is drilled in a downward direction as nearly vertical as possible through a side of the tree, so it is as close to the bark and in the sap wood, but not into the heart wood.

After such hole is made, approximately from one to two ounces of the above-described solution is immediately poured into the hole, and the latter may be be plugged or closed by an ordinary cork or by any other suitable means.

The formation of the hole and the application of the solution are not performed during the dormant period of the tree, but during the period when the sap is flowing, and preferably after the harvest, when the solution will be taken up in the sap system for distribution to all parts of the tree, thereby effecting the increased resistance of the tree to damage from frost or freezing.

Usually an injection of from one to two ounces of the solution each year is adequate.

The solution that is poured into the hole formed in the main trunk of the tree or vine is relatively quickly assimilated into the sap near the bark of the tree and is distributed by the sap throughout the tree. Any deficiency in the tree appears to be corrected by the solution, and, as already stated, trees treated as described are far more resistant to danger from pests, thrips, hoppers, mildew and scale, as well as being resistant to injury from freezing.

Actual tests made in orchards where adjoining trees have been respectively treated and untreated and subjected to freezing temperatures show that the fruit on the treated trees has been undamaged by the cold, while the fruit on the untreated trees have frozen cells.

In the case of oranges, another phenomenon has been observed where the trees have been treated by the present method. The fruit picked from such trees have resisted spoilage and drying for many weeks after picking, and when kept at atmospheric temperature. The outer rind will dry to appreciable hardness and will darken and the pith layer between the outer skin and the juicy pulp will substantially disappear, but the latter will remain extremely juicy and unspoiled.

While the strength of the solution may be increased by increasing the percentage of the mixture, it has not been found that any appreciable benefit is gained, nor has it been found that any appreciable advantage is gained by treating trees more frequently than once each year or by applying a greater amount of the solution. The trees are not injured by the drilling of the hole, and in actual practice the same hole may be repeatedly used, by redrilling the same, inasmuch as it will substantially heal over between each treatment.

However, the ratio between the water and the mixture may be varied provided the ratio between the dioctyl sodium sulfo-succinate, Epsom salt, and methyl anthranilate in the mixture is substantially preserved, i.e., there are substantially equal amounts by weight of the dioctyl sodium sulfo-succinate and the Epsom salt and the amount of methyl anthranilate will be approximately one quarter that of either the sodium sulfo-succinate or the Epsom salt.

The solution is nontoxic and noncaustic and is not otherwise injurious to persons, animals or birds, even if inadvertently taken internally.

While the addition of the solution hereinbefore mentioned to the sap stream through the sap wood has been found to be highly effective, nevertheless similar results may be obtained by adding it to fertilizer for the plants or in the soil itself, whereby it is taken into the sap stream through the roots.

In the claims, the step of introducing the solution into the sap stream is intended to cover either introducing it directly into the sap stream by drilling a hole into the sap wood, and then placing the solution in the hole, or by introducing it through the roots in the same manner as nourishment is taken through the roots from the soil and fertilizer.

I claim:

1. The process of conditioning a plant to increase its resistance to damage by frost and insect pests that includes the step of:
   (a) introducing into the sap stream during the period in which the sap is flowing an aqueous solution of dioctyl sodium sulfo-succinate, Epsom salt, and methyl anthranilate each of these three ingredients being in substantial but non-phytotoxic amount.

2. The process of conditioning a tree including the fruit thereon to increase their resistance to injury from freezing that comprises the steps of:
   (a) forming an outwardly opening and downwardly extending recess in the sap wood of the trunk of such tree;
   (b) placing an aqueous solution of dioctyl sodium sulfo-succinate, Epsom salt, and methyl anthranilate in said hole during the period when the sap is flowing in said sap wood each of these ingredients being in substantial but non-phytotoxic amount.

3. The process of conditioning a plant to increase its resistance to damage by frost and insect pests that includes the step of:
   (a) introducing into the flowing sap stream in said plant a solution comprising, by weight, approximately 98% water, 0.74% dioctyl sodium sulfo-succinate, 0.74% Epsom salt and 0.18% methyl anthranilate.

4. The process of conditioning a fruit bearing tree and its fruit to increase its resistance to injury by frost and insect pests that comprises the step of:
   (a) introducing into the sap wood of said tree approximately one-half to two ounces of a solution of approximately 98% water, 0.74% dioctyl sodium sulfo-succinate, 0.74% Epsom salt, and 0.18% methyl anthranilate.

5. The process as defined in claim 4 in which said solution is introduced a relatively short time after the fruit from said tree has been harvested.

6. A product for use in conditioning plants that comprises, by weight, a solution of approximately 98% water, 0.74% dioctyl sodium sulfo-succinate, 0.74% Epsom salt and 0.18% methyl anthranilate.

7. The process of conditioning a tree including the fruit thereon to increase their resistance to injury from freezing that comprises the steps of:
   (a) forming an outwardly opening and downwardly extending recess in the sap wood of the trunk of said tree;
   (b) placing an aqueous solution of dioctyl sodium sulfo-succinate, Epsom salt, and anthranilate in said hole during the period when the sap is flowing in said sap wood, which solution comprises, by weight, 98% water, and approximately a 1.7% mixture of 100% pure dioctyl sodium sulfo-succinate, Epsom salt and methyl anthranilate.

References Cited in the file of this patent

UNITED STATES PATENTS

| | | |
|---|---|---|
| 2,083,065 | Heyl | June 8, 1937 |
| 2,610,117 | Hopf | Sept. 9, 1952 |
| 2,851,394 | Vaughan | Sept. 9, 1958 |
| 2,912,316 | Skinner | Nov. 10, 1959 |
| 2,967,128 | Kare | Jan. 3, 1961 |

FOREIGN PATENTS

| | | |
|---|---|---|
| 46,244 | India | of 1951 |

OTHER REFERENCES

Maximow, N. A.: Chemische Schutzmittel der Pflanzen Gegen Erfrieren, in Berchite der Deutschen Botanischen Gesellschaft, 30(2) 52–65 and 30(6) 293–305. Berlin, Germany, 1912.

Abstracts of these two Maximow articles, in Chemical Abstracts, vol. 6 (1912), pages 1628 and 3446, each entitled "Substances Which Protect the Plant Against Freezing."

Chemurgic Digest, vol. 5, No. 5, page 111, Mar. 15, 1946, Science Enlisted To Beat Frost Damage.

Chemical Abstracts, vol. 43 (1949) column 4815–c.d, Bitter Orange and Oil of Neroli.

Condensed Chemical Dictionary, 5th ed., New York, Reinhold, 1956, pages 398, 436, 676, 712 (1956).

Chemical Abstracts, vol. 53, column 13, 512–d,e (1959), Galet Lemon Extract.